United States Patent [19]

Secemski

[11] Patent Number: 5,316,380
[45] Date of Patent: May 31, 1994

[54] LASER POWER METER

[76] Inventor: Ephraim Secemski, 55 Hizkiyahu Hamelech Street, Jerusalem, Israel, 93224

[21] Appl. No.: 994,377
[22] Filed: Dec. 21, 1992

[30] Foreign Application Priority Data

Dec. 26, 1991 [IL] Israel .................................. 100528

[51] Int. Cl.$^5$ ........................................... G01K 17/00
[52] U.S. Cl. .................................... 374/32; 356/216
[58] Field of Search ................... 73/32; 250/352, 338, 250/349; 356/216

[56] References Cited

U.S. PATENT DOCUMENTS

| | | |
|---|---|---|
| 3,453,432 | 7/1969 | McHenry . |
| 3,459,945 | 8/1969 | Astheimer et al. . |
| 3,622,245 | 11/1971 | Rasmussen . |
| 3,939,706 | 2/1976 | Pinson ............................ 250/352 X |
| 4,567,373 | 1/1986 | O'Meara, Jr. et al. . |
| 4,606,651 | 8/1986 | Anitoff ............................ 356/326 |
| 4,701,619 | 10/1987 | Carter . |
| 4,820,916 | 4/1989 | Patriquin . |
| 4,964,735 | 10/1990 | Sasnett et al. ........................ 374/32 |

OTHER PUBLICATIONS

"A Real-Time Visual Display of a High-Power Laser Beam" I. W. Boyd et al, J. Phys. E. Sci. Instrum., vol. 15, Apr. 1982 (G.B.) pp. 421-422.

"Calorimetric Measurement of Optical Power from Pulsed Lasers", by S. E. Smathers and George Maksymonko, pp. 431-433 IEEE Transactions vol. 4 Nov. 1972.

"Calorimetric Measurements of Laser Energy and Power", by Stuart R. Gunn, pp. 105-115.

Primary Examiner—Daniel M. Yasich
Attorney, Agent, or Firm—Anderson Kill Olick & Oshinsky

[57] ABSTRACT

An isoperibol calorimeter type laser power meter including a laser beam energy absorber, apparatus for measuring the change in temperature of the absorber, electronic timing apparatus for defining a period of time over which a change in temperature of the absorber takes place and apparatus operative in response to a measured change in temperature over the period of time to provide an output indication of laser power.

20 Claims, 2 Drawing Sheets

LASER POWER METER

FIELD OF THE INVENTION

The present invention relates generally to laser power meters and more particularly to laser power meters of the isoperibol type.

BACKGROUND OF THE INVENTION

Various types of laser power meters are known. As described in an article entitled "Calorimetric Measurements of Laser Energy and Power" in *J. Phys. E.*, Vol. 6, February 1973, pages 105–114, calorimeters used for laser measurements may be generally classified as being of either the "isoperibol" or of the "conduction" type. The isoperibol calorimeter is conceptually simple in design since in principle, a single measurement of the temperature rise of the thermally isolated beam absorber is all that is required to define the beam energy which, when divided by the exposure time, gives the beam power.

One of the major disadvantages of the isoperibol calorimeter laser power meter is the requirement to accurately define the exposure time. Conventionally, in using the simplest type of isoperibol calorimeters, such as those commercially available from Optical Engineering Inc. of Santa Rosa, Calif., U.S.A., an operator is expected to time the insertion of the absorber probe into a laser beam path, using a watch. Such a technique introduces inherent inaccuracies into the measurement and makes measurement accuracy very dependent on operator skill.

In an attempt to overcome this problem, isoperibol calorimeters having electronically timed shutters have been described in the literature. Reference is made in this connection to "Calorimetric Measurements of Optical Power from Pulsed Lasers" in *IEEE Trans. on Instr. and Meas.*, Vol. IM-21, November 1972, pages 430–433. This solution is not entirely satisfactory, since the addition of a shutter makes the calorimeter more complicated and expensive and thus commercially unviable for many applications.

U.S. Pat. No. 3,459,945 describes a laser calorimeter including a pyroelectric detector having a timed mechanical shutter to measure continuous wave beams. U.S. Pat. No. 3,622,245 describes a double plate calorimeter wherein an electronic timer is used to supply current to a calibration heater coil for a defined time, in order to define a given electrical calibration input energy.

SUMMARY OF THE INVENTION

The present invention seeks to provide an improved isoperibol calorimeter laser power meter which overcomes disadvantages of the prior art.

There is thus provided in accordance with a preferred embodiment of the present invention an isoperibol calorimeter type laser power meter including a laser beam energy absorber, apparatus for measuring the change in temperature of the absorber, electronic timing apparatus for defining a period of time over which a change in temperature of the absorber takes place and apparatus operative in response to a measured change in temperature over the period of time to provide an output indication of laser power.

In accordance with a preferred embodiment of the invention, the electronic timing apparatus is automatically actuated to begin a measurement period in response to the sensed impingement of a laser beam on the absorber. Alternatively, the measurement period may be begun in response to manual actuation.

Additionally in accordance with a preferred embodiment of the invention, apparatus is provided for electronic correction of errors due to heat loss from the absorber.

Further in accordance with a preferred embodiment of the present invention, electrical absorber heating apparatus may be provided for calibration purposes as an integral part of the laser power meter.

Additionally in accordance with a preferred embodiment of the present invention, apparatus is provided for varying the duration of the measurement period as a function of the laser power level being absorbed.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
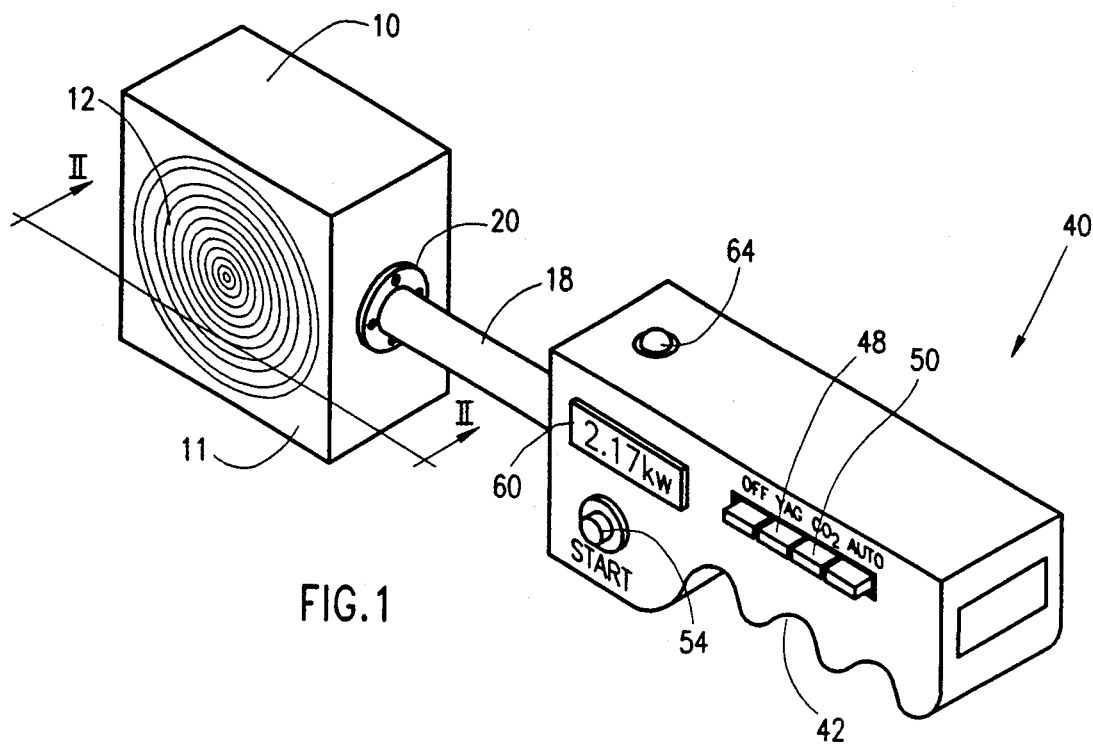
FIG. 1 is a pictorial illustration of an isoperibol calorimeter type laser power meter constructed and operative in accordance with a preferred embodiment of the present invention.
Figure 2:
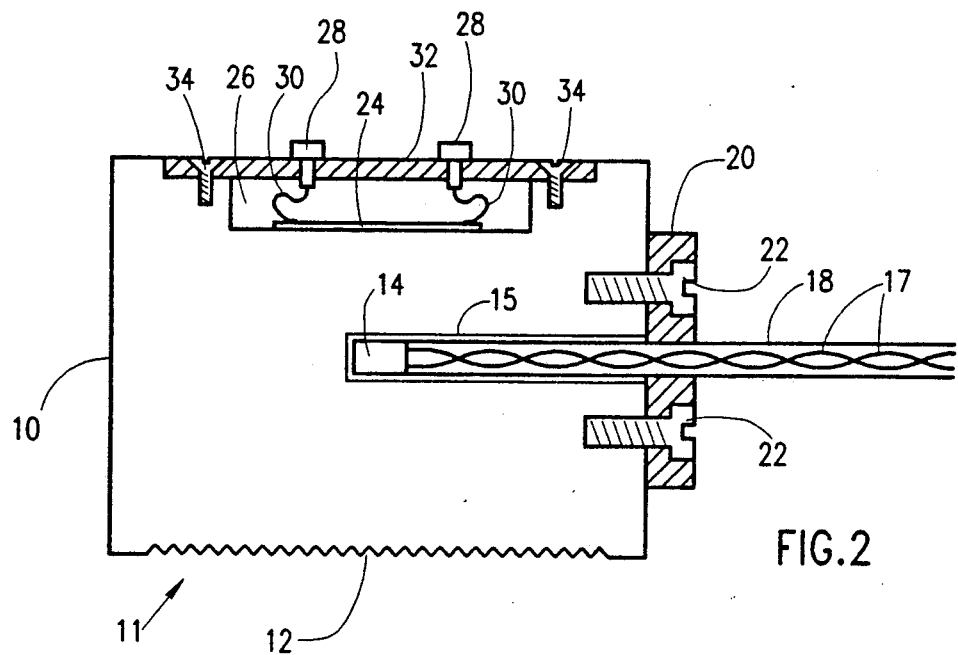
FIG. 2 is a sectional illustration of part of the apparatus of FIG. 1, taken along the lines II—II of FIG. 1.
Figure 3:
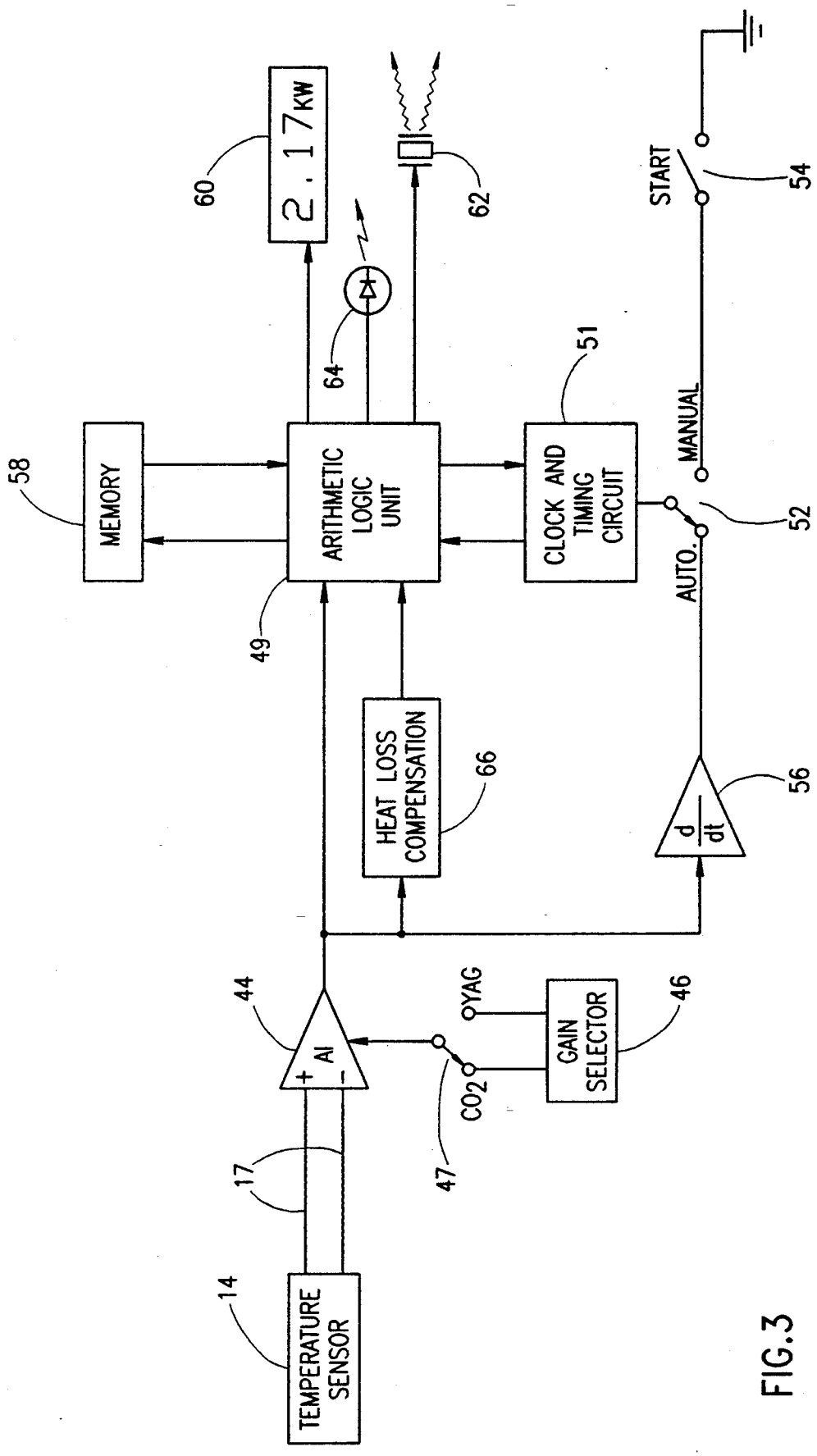
FIG. 3 is a partially schematic, partially simplified block diagram illustration of part of the isoperibol calorimeter type laser power meter of FIG. 1.

Reference is now made to FIGS. 1–3 which illustrate an isoperibol calorimeter type laser power meter constructed and operative in accordance with a preferred embodiment of the present invention. As seen, particularly in FIGS. 1 and 2, the power meter comprises an absorber block 10, preferably formed of metal, whose laser beam facing surface 11 is preferably formed with an array of ridges 12 to enhance absorption of laser beam energy.

The laser beam facing surface 11 is preferably formed with a coating of a material, such as black solar absorber paint or a thin layer of ceramic, such as aluminum oxide, having high absorptivity at the wavelength of the laser beam whose power is to be measured. The weight of the absorber block 10 is selected so that preferably its temperature rise is limited to not more than 60 degrees centigrade over a predetermined exposure duration under maximum rated power conditions, thus limiting power measurement inaccuracies due to heat losses from the absorber to less than 1%.

Normally, the absorber block 10 is configured such that its depth along an axis parallel to the intended impinging laser beam is less than its other dimensions, in order to enable insertion of the absorber into relatively narrow openings along the beam path.

A temperature sensor 14 is preferably disposed at the center of the absorber block 10, at the end of a tube 18 inserted into a narrow bore 15. Signal leads 17 extend from sensor 14 through tube 18. Tube 18 is preferably formed of a metal, such as stainless steel, having relatively low thermal conductivity and may be mounted onto absorber block 10 by means of a flange 20 and screws 22.

In accordance with an optional embodiment of the present invention, a relatively thin heater element 24 may be mounted in a recess 26 formed in the absorber block 10, preferably at the back thereof. This heater element 24 may be employed to heat the absorber block for calibration purposes. Current may be supplied to the heater element 24 from an external power supply (not shown) via a pair of terminals 28 coupled to the heater element 24 via conductors 30. The heater element may be enclosed by a cover element 32, mounted onto the absorber element 10 by means of screws 34.

Mounted on tube 18 is a combination handle and control unit 40 which may be formed with a handgrip surface 42. The unit 40 may be fixedly mounted onto tube 18 or alternatively removably mounted thereon.

As seen in FIG. 3, the temperature sensor 14 of the isoperibol calorimeter type laser power meter of the present invention is coupled by leads 17 to an amplifier 44 whose gain may be adjusted by means of a gain selector 46 according to the wavelength of the laser beam whose power is to be measured. The gain selector 46 is operated by a wavelength sensitivity selector 47 typically having two selectable push buttons 48 and 50 (FIG. 1), such as for YAG and $CO_2$ lasers respectively.

If temperature sensor 14 employs a thermocouple, then amplifier 44 is preferably a dedicated thermocouple amplifier, such as an AD595 manufactured by Analog Devices Inc., of Norwood, Mass., U.S.A. If temperature sensor 14 employs a semiconductor temperature sensor such as an AD590 manufactured by Analog Devices Inc. or an LM35 manufactured by National Semiconductor Corporation, Santa Clara, Calif., U.S.A., the amplifier 44 may be a conventional operational amplifier.

The output from amplifier 44 is supplied to an arithmetic logic unit 49, which is operative to calculate the temperature rise sensed by sensor 14. The arithmetic logic unit 49 receives START and STOP signals indicating the beginning and the end of a temperature change measuring period from clock and timing circuitry 51.

Provision of START signals may be realized either manually or automatically, by suitable positioning of a selector switch 52. If manual operation is selected, the beginning of the temperature change measuring period may be initiated by manual actuation of a START button 54 following insertion of the absorber into a laser beam whose power is to be measured.

A STOP signal is generated by circuitry 51 a predetermined time after the START signal.

If automatic operation is selected, the impingement of the laser beam is sensed as follows: a) an output signal from amplifier 44 is provided to a differentiating amplifier 56 which provides an output representative of the time rate of change of temperature measured by sensor 14; b) circuitry 51 is responsive to receipt of a signal from amplifier 56 indicating heating of the absorber at least at a predetermined threshold rate, for commencing the measuring period.

Upon receipt of a START signal from clock and timing circuitry 51, the arithmetic logic unit 49 waits a predetermined delay time, such as a second, in order to ensure that any initial exponential transients are completed and then stores, as a starting temperature, the current temperature at sensor 14 in a memory 58. Upon receipt of a STOP signal from circuitry 51, the arithmetic logic unit 49 recalls the starting temperature from memory 58 and subtracts it from the temperature currently at sensor 14 to determine the temperature rise between the START and STOP signals.

Since the duration of the measuring period from the termination of the delay time is predetermined and known, multiplication of the measured temperature rise by a predetermined appropriate conversion factor provides an indication of the laser power of the laser beam. This multiplication is carried out by the arithmetic logic unit 49 and is supplied to a digital display 60.

A buzzer 62 may be actuated by the arithmetic logic unit 49 to indicate to the user that the measuring period is terminated and that the absorber block 10 can be removed from the laser beam. Overheating of the absorber block may be indicated by an indicator light 64 in response to an appropriate input from the arithmetic logic unit 49.

In accordance with a preferred embodiment of the invention there is provided heat loss compensation apparatus 66 which receives an output from amplifier 44 and provides a first order correction input to the arithmetic logic unit 49 in respect of heat losses from the absorber block 10. The correction may be arrived at empirically by measuring the power of a fixed laser beam as a function of absorber block temperature.

According to a further alternative embodiment of the invention, the measuring period need not be fixed, but instead may be lengthened as the value of the time derivative of the absorber block temperature, indicated by amplifier 56, decreases.

This decrease indicates a corresponding decrease in the laser beam power level. Such an arrangement maintains measurement accuracy over a wider dynamic range than is possible with a fixed measuring period. In order to provide a variable measuring period, the arithmetic logic unit 49 must provide a laser beam power dependent control signal to the timing circuit 51.

In accordance with a preferred embodiment of the invention, instead of using separate analog and logic components as in the above-described embodiment, the output voltage from amplifier 44 may be directly converted to a digital signal by means of an A/D converter. In such a case, all of the signal processing and user interface functions may be performed using a microprocessor.

The laser power meter of the present invention has a number of advantages over the prior art. These advantages will now be summarized:

The inherent timing inaccuracy of the prior art is overcome by the use of an electronic timing circuit which defines the effective time period over which the temperature change in the absorber block 10 as the result of its current exposure to a laser beam is measured.

Due to the high accuracy of measurement, an accurate power measurement can be obtained in a fraction of the time required using prior art apparatus. Whereas the prior art requires approximately 20 seconds of exposure to the laser beam, the present invention requires only a few seconds, with higher accuracy than according to the prior art.

As a result of the shorter required exposure time, less energy is required to be absorbed at any given laser power level, thus enabling the absorber block 10 to be made smaller and lighter and/or the maximum block temperatures may be reduced, thus reducing inaccuracies due to heat losses from the absorber block.

Additionally in accordance with a preferred embodiment of the present invention the arithmetic logic unit 49 is operative to vary the duration of the measurement period as a function of the laser power level being absorbed. Thus, as the laser power level is increased, the measurement period may be decreased and vice versa.

It will be appreciated by persons skilled in the art that the present invention is not limited by what has been particularly shown and described hereinabove. Rather the scope of the present invention is defined only by the claims which follow:

I claim:

1. An isoperibol calorimeter type laser power meter comprising:
    a laser beam energy absorber;
    a temperature sensor for measuring the change in temperature of the absorber in response to impingement thereon of an input laser beam; and
    electronic circuitry operative in response to a measured change in temperature, which measured change in temperature is proportional to the energy of said input laser beam, occurring in the absorber over a period of time whose duration is determined by said electronic circuitry to provide an output indication of laser power, which is the rate of change of the energy of said input laser beam per unit time.

2. Apparatus according to claim 1 and wherein said electronic circuitry also comprises an electronic timer for defining said period of time over which a change in temperature of the absorber is measured, which timer is automatically actuated to begin a measurement period in response to the sensed impingement of a laser beam on the absorber.

3. Apparatus according to claim 2 and also comprising a time control for varying the duration of the measurement period as a function of the laser power level being absorbed.

4. Apparatus according to claim 2 and also comprising an absorber heater and calibrator integrally mounted in the laser power meter.

5. Apparatus according to claim 4 and also comprising a time control for varying the duration of the measurement period as a function of the laser power level being absorbed.

6. Apparatus according to claim 2 and also comprising electronic circuitry for electronic correction of errors due to heat loss from the absorber.

7. Apparatus according to claim 6 and also comprising an absorber heater and calibrator integrally mounted in the laser power meter.

8. Apparatus according to claim 6 and also comprising a time control for varying the duration of the measurement period as a function of the laser power level being absorbed.

9. Apparatus according to claim 1 and also comprising an electronic timer for defining said period of time over which a change in temperature of the absorber is measured, which timer is actuated to begin a measurement period in response to manual actuation.

10. Apparatus according to claim 9 and also comprising a time control for varying the duration of the measurement period as a function of the laser power level being absorbed.

11. Apparatus according to claim 9 and also comprising an absorber heater and calibrator integrally mounted in the laser power meter.

12. Apparatus according to claim 9 and also comprising electronic circuitry for electronic correction of errors due to heat loss from the absorber.

13. Apparatus according to claim 12 and also comprising an absorber heater and calibrator integrally mounted in the laser power meter.

14. Apparatus according to claim 12 and also comprising a time control for varying the duration of the measurement period as a function of the laser power level being absorbed.

15. Apparatus according to claim 1 and also comprising electronic circuitry for electronic correction of errors due to heat loss from the absorber.

16. Apparatus according to claim 15 and also comprising a time control for varying the duration of the measurement period as a function of the laser power level being absorbed.

17. Apparatus according to claim 15 and also comprising an absorber heater and calibrator integrally mounted in the laser power meter.

18. Apparatus according to claim 1 and also comprising an absorber heater and calibrator integrally mounted in the laser power meter.

19. Apparatus according to claim 18 and also comprising a time control for varying the duration of the measurement period as a function of the laser power level being absorbed.

20. Apparatus according to claim 1 and also comprising a time control for varying the duration of the measurement period as a function of the laser power level being absorbed.

* * * * *